(12) United States Patent
van Hoek

(10) Patent No.: US 11,568,489 B1
(45) Date of Patent: Jan. 31, 2023

(54) SYSTEM AND METHOD FOR PROVIDING AN AUTOMATED TRADING PLATFORM FOR CROSS-BORDER SETTLEMENTS

(71) Applicant: MoneyGram International, Inc., Minneapolis, MN (US)

(72) Inventor: Bart S. van Hoek, Dallas, TX (US)

(73) Assignee: MoneyGram International, Inc., Dallas, TX (US)

(*) Notice: Subject to any disclaimer, the term of this patent is extended or adjusted under 35 U.S.C. 154(b) by 0 days.

(21) Appl. No.: 17/476,130

(22) Filed: Sep. 15, 2021

Related U.S. Application Data

(60) Provisional application No. 63/078,532, filed on Sep. 15, 2020.

(51) Int. Cl.
*G06Q 40/04* (2012.01)
*G06F 16/951* (2019.01)

(52) U.S. Cl.
CPC .......... *G06Q 40/04* (2013.01); *G06F 16/951* (2019.01)

(58) Field of Classification Search
None
See application file for complete search history.

(56) References Cited

U.S. PATENT DOCUMENTS

| | | | | |
|---|---|---|---|---|
| 10,680,828 | B2 * | 6/2020 | Qiu | H04L 9/3265 |
| 10,965,447 | B1 * | 3/2021 | Prokopenya | H04L 9/0643 |
| 2019/0012660 | A1 * | 1/2019 | Masters | G06Q 20/381 |
| 2019/0089713 | A1 * | 3/2019 | Leftwich | H04L 47/50 |

* cited by examiner

*Primary Examiner* — Narayanswamy Subramanian
(74) *Attorney, Agent, or Firm* — Law Office of Bill R. Naifeh

(57) ABSTRACT

Systems and methods described herein for automated cross-border settlement transactions, the system comprising: a trading platform network coupled to a plurality of settlement solution networks; and an autonomous bot configured to execute a plurality of instructions for: executing a scheduler to convert a plurality of user requirements and system requirements into a target schedule; executing a plurality of settlement transactions via the settlement solutions using the trading platform; determining a differential between the executed settlement transactions and the target schedule; and modifying the execution of future settlement transactions if the differential is greater than a predefined threshold.

9 Claims, 12 Drawing Sheets

CONFIRM TRANSACTION

| | | | |
|---|---|---|---|
| USD Notional | 1,000.00 | Ripple Rate | 22.7545 |
| XRP/USD | 0.1997 | Reuters Benchmark | 22.8525 |
| Bitstamp_usd Fees | 0.70 | | |
| XRP Amount | 5,003.4849 | Spread % | -0.43% |
| XRP/MXN | 4.5500 | Spread Pips | -980 |
| Bitso_mxn Fees | 11.38 | USD Loss | -4.31 |
| MXN Amount | 22,754.47 | USD Rebate (est.) | 3.79 |
| Destination | 112180000310052107 | USD Incentive (est.) | 39.83 |

Status READY
Quote expires in 59:40

RENEW    CONFIRM

Fig. 3

SCHEDULE WEEKLY JOB

Total amount to be transferred per day ___2,000,000 MXN___ — Total amount to be received value cannot be smaller than (total amount/100)

Individual transaction size ___200,000 MXN___ — value cannot be bigger than the total amount value cannot be smaller than (total amount/100)

Maximum spread difference ___3.00%___ — If a quote is generated with a spread higher than the given value, the trade will not be executed and retried at a later time (value up to 2 decimal places)

Trade only during business hours ☑ — FX trading is available 24/7 with both ripple and the interbank selecting business hours only limits trading to 9:AM to 5:PM CST Include weekend ☐ — Selecting include weekend allows this "bot" to continue trading on Saturday and Sunday.

Starting date ___Mon July 29___ — Selecting a start date allows to schedule weekly bots ahead of time

[NEXT]

| Time | Status | |
|---|---|---|
| 12:55 Sep 04, 2020 | COMPLETE | |
| 13:00 Sep 04, 2020 | COMPLETE | |
| 13:06 Sep 04, 2020 | COMPLETE | |
| 13:15 Sep 04, 2020 | COMPLETE | |
| 13:23 Sep 04, 2020 | COMPLETE | |
| 13:28 Sep 04, 2020 | COMPLETE | |
| 13:38 Sep 04, 2020 | COMPLETE | |
| 13:43 Sep 04, 2020 | SCHEDULED | |
| 13:54 Sep 04, 2020 | SCHEDULED | |
| 14:01 Sep 04, 2020 | SCHEDULED | |
| 14:08 Sep 04, 2020 | SCHEDULED | |
| 14:15 Sep 04, 2020 | SCHEDULED | |
| 14:22 Sep 04, 2020 | SCHEDULED | |
| 14:31 Sep 04, 2020 | SCHEDULED | |
| 14:37 Sep 04, 2020 | SCHEDULED | |
| 14:46 Sep 04, 2020 | SCHEDULED | |
| 14:49 Sep 04, 2020 | SCHEDULED | |
| 14:58 Sep 04, 2020 | SCHEDULED | |
| 3:00:00 PM - 6:00:00 PM | | Completed 0 / 24 > |
| 6:00:00 PM - 9:00:00 PM | | Completed 0 / 25 > |
| 9:00:00 PM - 12:00:00 AM | | Completed 0 / 24 > |

Fig. 7B

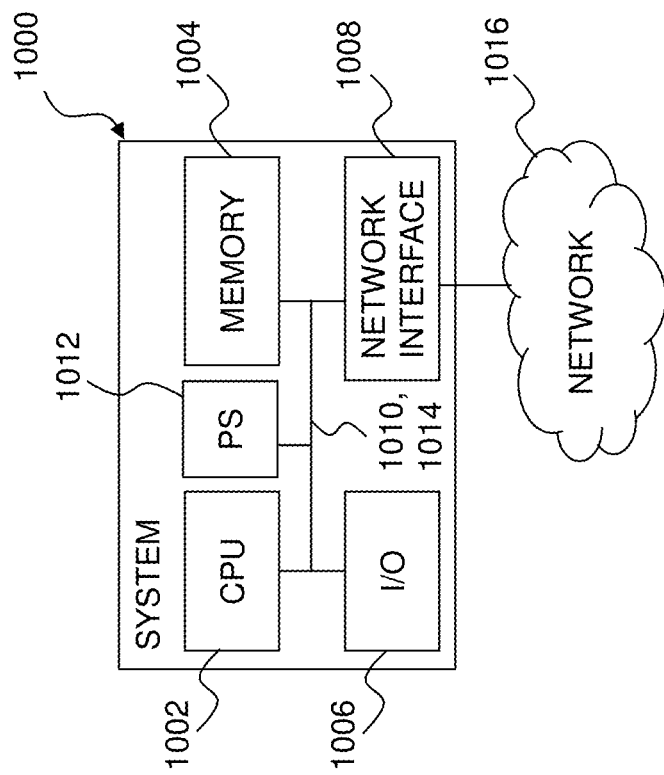

US 11,568,489 B1

SYSTEM AND METHOD FOR PROVIDING AN AUTOMATED TRADING PLATFORM FOR CROSS-BORDER SETTLEMENTS

CROSS REFERENCE TO RELATED APPLICATIONS

This application claims the benefit of the filing date of U.S. provisional patent application Ser. No. 63/078,532, filed on Sep. 15, 2020, the disclosure of which is incorporated herein by reference for all purposes.

TECHNICAL FIELD

The invention relates in general to systems and methods for optimizing cross-border settlements by using automated services to handle and execute transaction calls.

BACKGROUND

Many money transfer service providers operate large money transfer networks that include infrastructure located all over the world. These money transfer networks are utilized to provide money transfer services to customers of the money transfer service providers. For example, the money transfer services allow a first party, referred to as a sending party, to send an amount of funds to a second party, referred to as a receiving party. In order to utilize the money transfer service, the sending party submits a request to the money transfer service provider. The request typically includes information that identifies the sending party and the receiving party, as well as information that indicates the amount of funds, referred to as a send amount, to be transferred to the receiving party. The money transfer service provider typically collects an amount of funds that is greater than the send amount (e.g., due to fees charged by the money transfer service provider for the money transfer transaction service) from the sending party and once the amount of funds is received, a money transfer agent is authorized to fund a remittance of the send amount to a receiving party.

To facilitate money transfer transactions for its customers, a money transfer service provider generally maintains bank accounts in various regions where the money transfer services are to be provided. The amount of funds received from the sending party may be transferred to a first bank account, such as a holding bank account, established with a first bank operating in the region where the sending party is located, and the remittance of the receive amount to the receiving party is funded from a bank account established with a second bank operating in the region where the receiving party is located. For example, where the money transfer transaction is initiated between a sending party located in the United States and a receiving party located in Mexico, funds received from the sending party may be transferred to a first bank account, such as a bank account that the money transfer service provider has established with a bank operating in the United States, and the remittance of the receive amount may be funded from a second bank account, such as a bank account that the money transfer service provider has established with a bank operating in Mexico.

SUMMARY

Systems and methods described herein facilitate the functionality of a network for implementing cryptocurrency based money transfer transactions between a sending party and a receiving party are described. In certain embodiments, there is system for automated cross-border settlement transactions, the system comprising: a trading platform located on at least one server and coupled to a plurality of settlement solutions; and an autonomous bot located on the at least one server, the autonomous bot configured to execute a plurality of instructions for: executing a scheduler to convert a plurality of user requirements and system requirements into a target schedule; executing a plurality of settlement transactions via the settlement solutions using the trading platform; determining a differential between the executed settlement transactions and the target schedule; and modifying the execution of future settlement transactions if the differential is greater than a predefined threshold.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of embodiments described herein, both as to its organization and method of operation, together with further objects and advantages will be better understood from the following written description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference should be made to the embodiments illustrated in greater detail in the accompanying drawings, wherein:

FIG. 3 is one example of a GUI page which may be employed to interface with the autonomous bot.

FIG. 6 is one example of a GUI page which may be employed to interface with the autonomous bot.

Figure 7A:
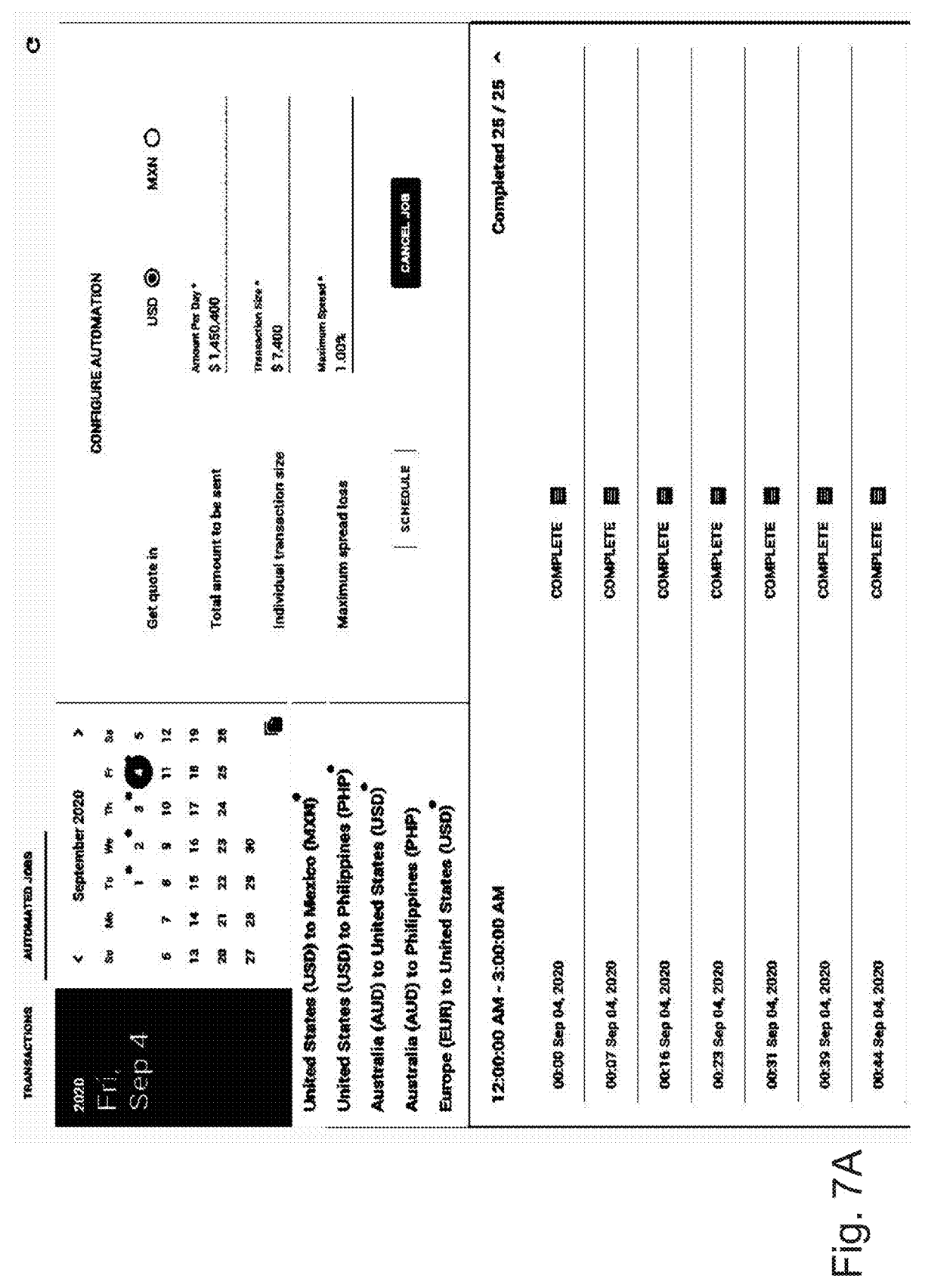

FIGS. 7A and 7B are examples of a GUI page which may be employed to interface with the autonomous bot.

FIG. 10 is one embodiment of a server which could implement the autonomous bot.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
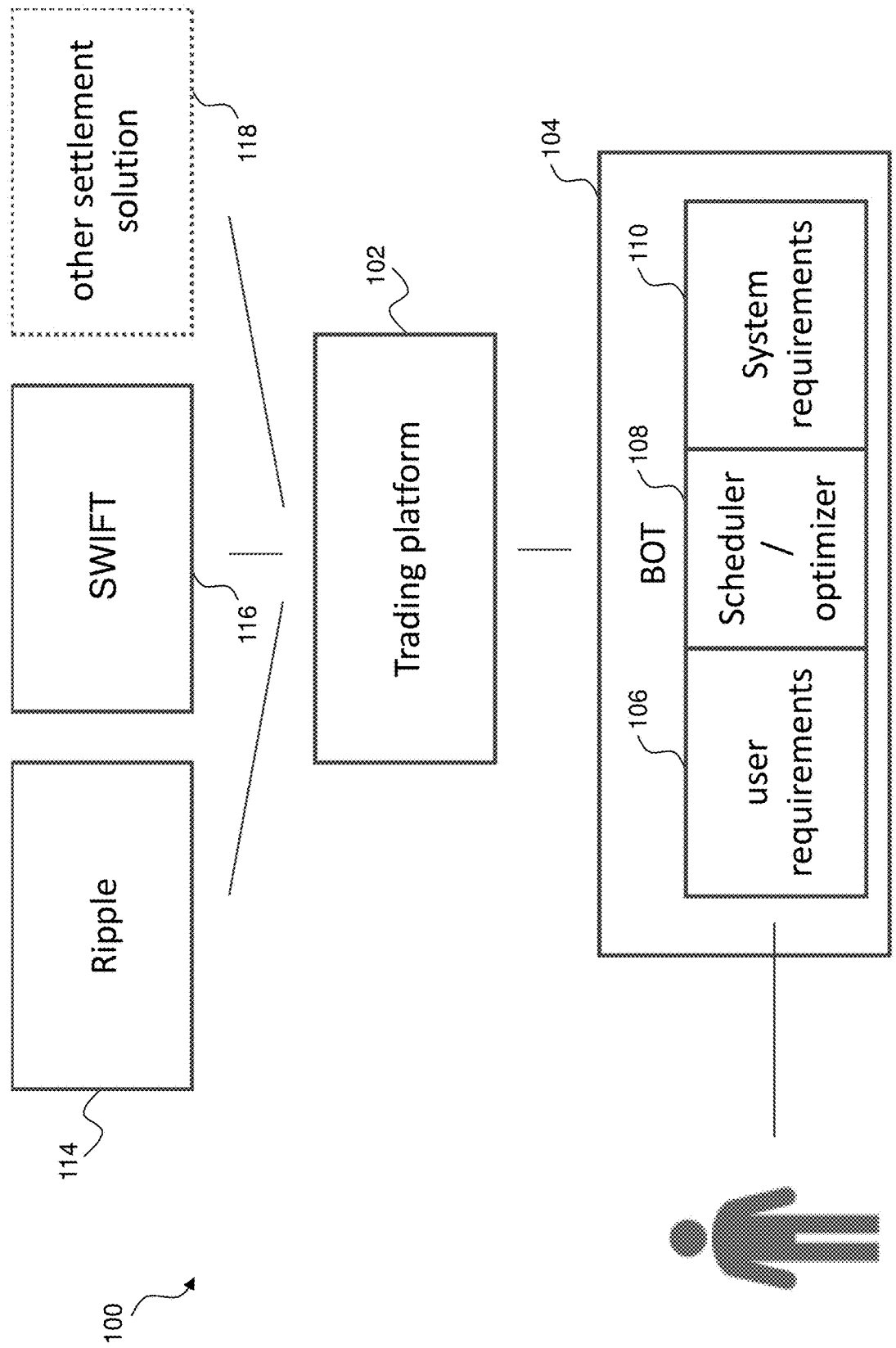
FIG. 1 is block diagram of a system for implementing an autonomous bot configured to provide the desired functionality described below.

Referring to FIG. 1, one embodiment of an environment 100 includes a trading platform 102 that interacts with an autonomous bot 104, which represents one or more services that are configured to provide desired functionality. It is understood that both the trading platform 102 and autonomous bot 104 may reside on a single server in some embodiments. In the present example, the autonomous bot 104 may include and/or handle user requirements 106 (e.g., user transaction parameters), a scheduler and/or optimizer 108, and system requirements 110 (e.g., internal transaction parameters). The autonomous bot 104 interacts with a customer/user 112, which may be a person, another program or service, or an institutional entity, such as a corporate treasury department.

The autonomous bot performs various functions (described below in greater detail) using the trading platform 102 to interact with third party or in-house settlement solutions. For purposes of example, the settlement solutions include Ripple 114, Society for Worldwide Interbank Financial Telecommunication (SWIFT) 116, and/or other settlement solutions 118. Ripple 114 is discussed as an example only. There are many other currency and cryptocurrency exchanges. Such exchanges may provide a real time gross settlement system, a cryptocurrency exchange, currency exchange, and remittance network. Accordingly, references herein to settlement solution and/or currency exchange components may include, use, or otherwise interact with the technology of third party remittance network or exchange, such as Ripple. It is understood that Ripple is used for purposes of example and other settlement solutions may be used (including a custom settlement solution), and the present disclosure is not limited to the use of such third-party settlement solutions.

One or more of the components of the autonomous bot 104, such as the user requirements 106, the scheduler/optimizer 108, and system requirements 110 may include hardware and/or software technology that enables the services provided by the autonomous bot 104. It is understood that the components 106, 108, and 110 are for purposes of example only, and may be combined in whole or in part, may be further divided into additional subsets, or may be arranged in many different ways.

The autonomous bot 104, in conjunction with the trading platform 102, may use the settlement solutions 114, 116, and/or 118 to accomplish cross border settlements. For example, the autonomous bot 104, either separately or in conjunction with the trading platform 102, may provide a platform that can initiate and execute cross border settlement transactions. The platform may estimate all transfer costs before executing the settlement. The platform may perform real-time or near-real time cost comparisons with other settlement solutions. The platform may optimize transaction size by breaking up a transaction. The platform may randomize transaction times to prevent hedging. The platform may self-heal after failures have been detected. The platform may automate a settlement transaction based on factors such as currency, time, corridor, duration, and/or cost efficiency. The platform may evaluate liquidity of both the internal and external accounts. The platform may decide between different source currencies to reduce cost.

Figure 2A:
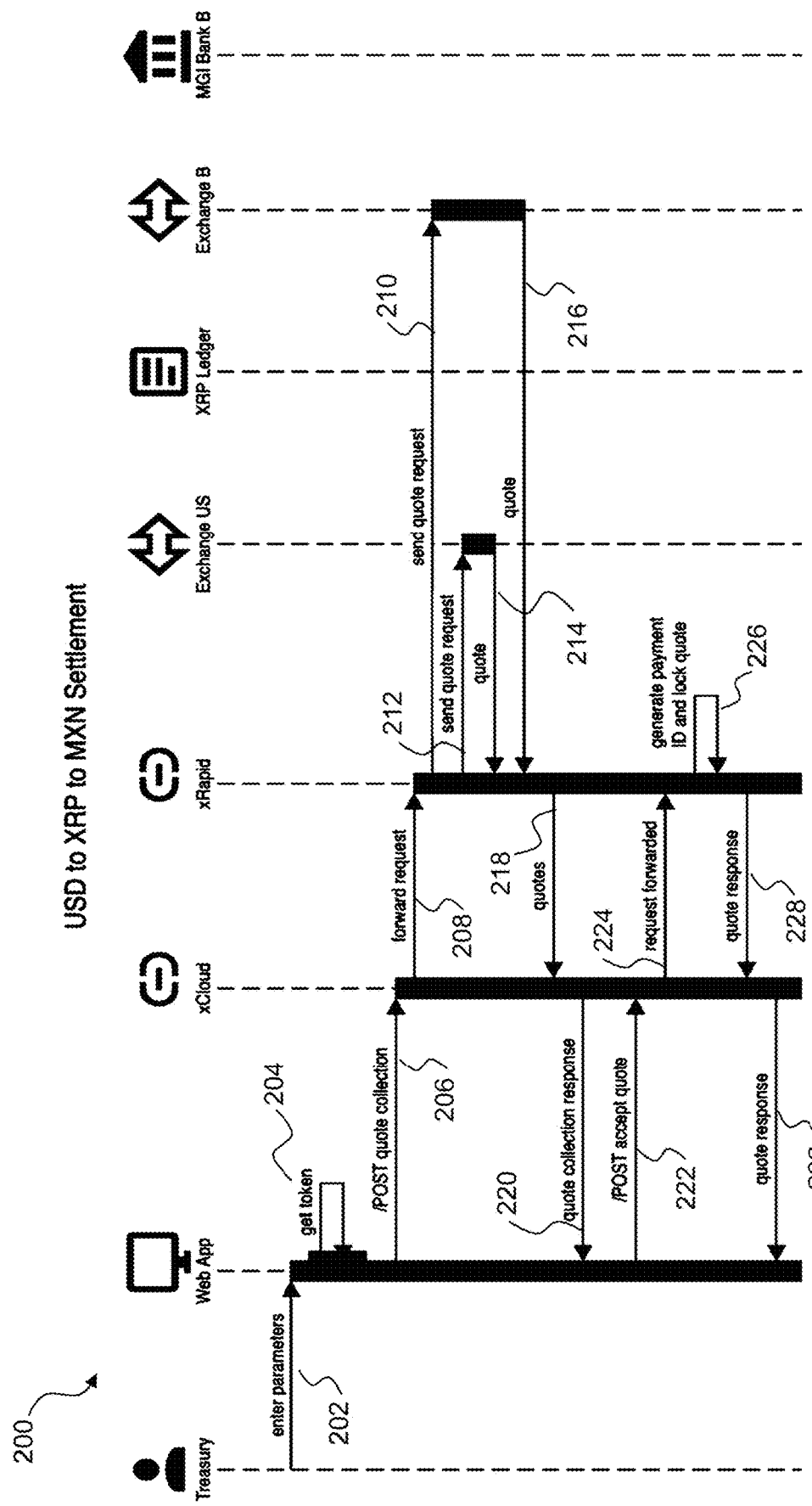
FIGS. 2A and 2B illustrate a sequence diagram illustrating one embodiment of a message flow that may occur between components of FIG. 1.
Figure 2B:
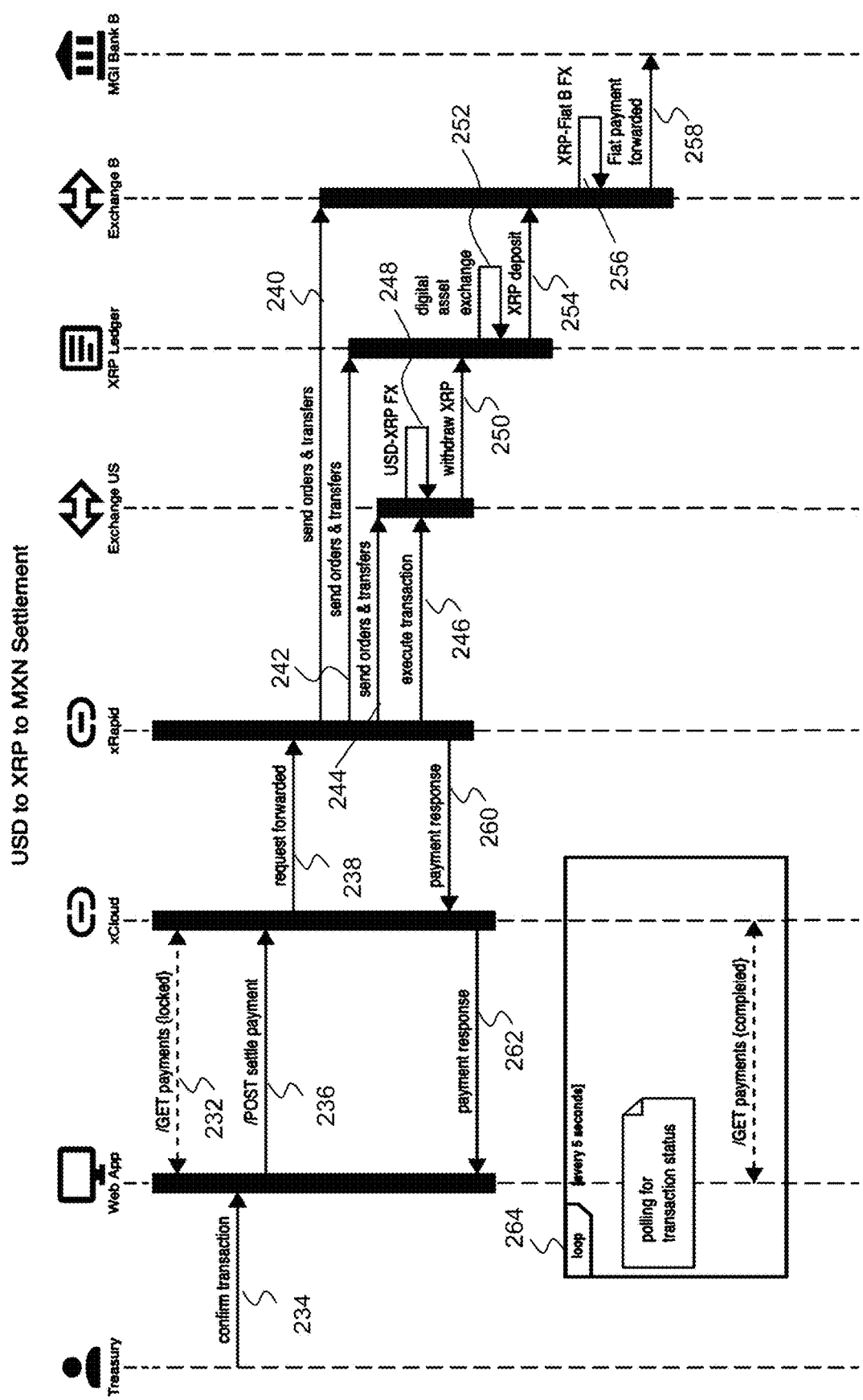

Referring to FIG. 2, a sequence diagram 200 illustrates one embodiment of a message flow that may occur between components of FIG. 1. The message flow represents a process by which a settlement transaction may occur using the settlement solution 114 to accomplish cross border settlements. It is understood that other processes may be executed with respect to the settlement solutions 116 and 118.

In some embodiments, the autonomous bot 104 may be a service living in a web application and its actions are represented by the vertical line under the Web App. The Web App may include a web interface and a server, with a user interacting via the interface and the server executing the logic. The autonomous bot 104 may be distributed across multiple system nodes, but this adds complexity to the system. For example, such distribution may provide a higher level of availability (e.g., in case a system goes down), but it requires coordination to make sure only one of the nodes is executing a transfer. In other embodiments, the autonomous bot may be configured and/or deployed in a different manner.

FIGS. 3 through 7 show how a customer (named Treasury) can interact with the web interface of the Web App. However, the same logic may apply to the autonomous bot 104. The Treasury provides the parameters for the bot, and the autonomous bot will handle and execute all calls (e.g., as calls to the RippleNet). The autonomous bot 104 may automatically confirm the transactions by checking a list of conditions.

In some embodiments, in step 202, the Treasury enters parameters for a transaction. In other embodiments, the Treasury may define a single transaction or a specific daily/weekly goal, and only when such a goal is provided will the autonomous bot apply logic to optimize the various transaction parameters. In step 204, the Web App gets a token and, in step 206, posts a quote collection to the RippleNet. RippleNet forwards the request internally in order to use Ripple's XRP for fund transfers in step 208.

RippleNet sends a quote request to all available exchanges that support the requested currency pair (e.g., to Exchange B in step 210 and simultaneously to Exchange A in step 212). These respond to RippleNet in steps 216 and 214, respectively. RippleNet receives the quotes in step 218, and sends a single quote to the Web App in step 220. For example, assume that the company wants a US→MXN exchange. Exchange A provides a quote for US→crypto, and Exchange B provides a quote for crypto→MXN. RippleNet will combine this information and provide a useful quote back to the company based on the requested currencies.

The Web App posts a quote acceptance to RippleNet in step 222, which forwards the request in step 224. RippleNet generates a payment ID and locks the quote in step 226. In step 228, RippleNet sends a quote response, which results in the response being sent to the Web App in step 230.

In step 232, the Web App initiates various processes such as scheduling calculations, breaking the transaction into smaller transactions, verification checks, and other processes, which are described in detail elsewhere in the present disclosure. The result is presented to the treasury, which confirms the transaction in step 234 (assuming the transaction is confirmed and not canceled).

In step 236, the Web App posts the settlement payment to the RippleNet, which forwards the request in step 238. RippleNet sends orders and transfers to the Exchange B in step 240, to Ripple's XRP ledger in step 242, and to the Exchange A in step 244. In step 246, RippleNet communicates to the Exchange A to execute the transaction. The Exchange A converts US dollars to XRP in step 248, and withdraws the XRP from the XRP ledger in step 250.

The XRP ledger performs a digital asset exchange in step 252, and deposits the XRP into the Exchange B in step 254. Exchange B converts the XRP into the desired fiat currency in step 256, and forwards the fiat payment to the payout bank/location in step 258. Following this payment process (or while the payment process is ongoing), RippleNet sends a payment response in step 260, which is forwarded to the Web App in step 262.

Step 264 represents a loop in which the Web App polls the RippleNet for the transaction status at defined intervals (e.g., every five seconds) until the payment response of step 262 is received or the transactions fails. If the transaction fails, the autonomous bot may automatically attempt to schedule the transaction again, based on the following information.

The autonomous bot 104 looks at the platform at a holistic level and generally focuses more on trends rather than individual transactions. If it was transaction specific, a simple retry mechanism would suffice (e.g., restarting at step 206 following a transaction failure). However, using a holistic approach, the autonomous bot 104 looks at its goal and determines that it is deviating from its optimal schedule. To resolve this higher-level issue, the autonomous bot 104 can use multiple options (e.g., more transactions, higher value transactions, different settlement mechanisms, or a combination of these).

Generally, with respect to the flow in FIG. 2, some of the autonomous bot logic applies before step 206, where the autonomous bot decides the transaction amount and timestamp, some of the autonomous bot logic happens before step 236, and some of the autonomous bot logic applies after step 262. For manual transactions, the result is presented to Treasury and they have to confirm. For autonomous bot transactions, this is automatically covered, and the autonomous bot is allowed to execute/settle transaction on Treasury's behalf, given that it adheres to the parameters that are set by Treasury 112 in steps 106 and 110.

Another thing that happens between steps 230 and 232 is not shown in the diagram, as this is taken care of by RippleNet. After accepting the quote, all parties (e.g., RippleNet, Exchange A, and Exchange B) are going to prepare for this transaction by making sure they are connected, have enough information, and are willing to proceed. This mutual agreement results into a locked state. In other words, this locked state means that all involved parties are capable and willing to execute this transaction before it is committed. In step 232, the process basically waits until this state becomes available. If no locked comes back, the transaction is aborted (and a self-healing process might kick in).

The autonomous bot 104 consumes the user configuration as will be described below in greater detail. The autonomous bot 104 may then divide the amount to be transferred into more efficient transaction sizes. These transactions may be scheduled throughout a time window with a quasi-random timestamp. While the transaction is being triggered, a list of checks may be verified.

A list of verification checks includes, but is not limited to, checking the proposed settlement cost on the chosen rails, checking the live FX rates at large financial institutions, checking liquidity in the destination market, checking liquidity at the sender (making sure enough funds are available), checking that the transaction does not exceed any of the risk parameters, checking if all services required to execute this trade are operational and active, and/or checking if this settlement transaction exceeds a minimum profitability margin. If all of the verification checks pass, only then will the settlement transaction be executed.

Checking the proposed settlement cost on the chosen rails involves one or more rails, which are technical channels for moving money. For example, rails may include SWIFT (the default, bank to bank transfer), RippleNet, and Visa Direct. Rail selections may be chosen based on cost and/or other parameters, such as time. As an example of time differences, RippleNet is relatively quick (e.g., thirty minutes), whereas SWIFT is around two to three days. It is noted that SWIFT is relatively slow, expensive, has high error rates, and very little transaction transparency, and while RippleNet tries to address these shortcomings, it comes with a lack of liquidity. Factors other than transaction cost may also be taken into account. For example, accessibility to funds may play a significant role from a cash flow, compliance, and liability perspective. Certain settlement methods that might be cheaper in cost may also have much longer processing times, resulting in friction throughout the settlement environment.

Checking the live FX rates at large financial institutions involves validating whether the delta of the two is within a maximum FX spread, which is directed to a percentage that dictates the maximum allowed negative deviation from a given benchmark. A positive deviation may always be allowed, as this is financially beneficial for the company.

Figure 4:
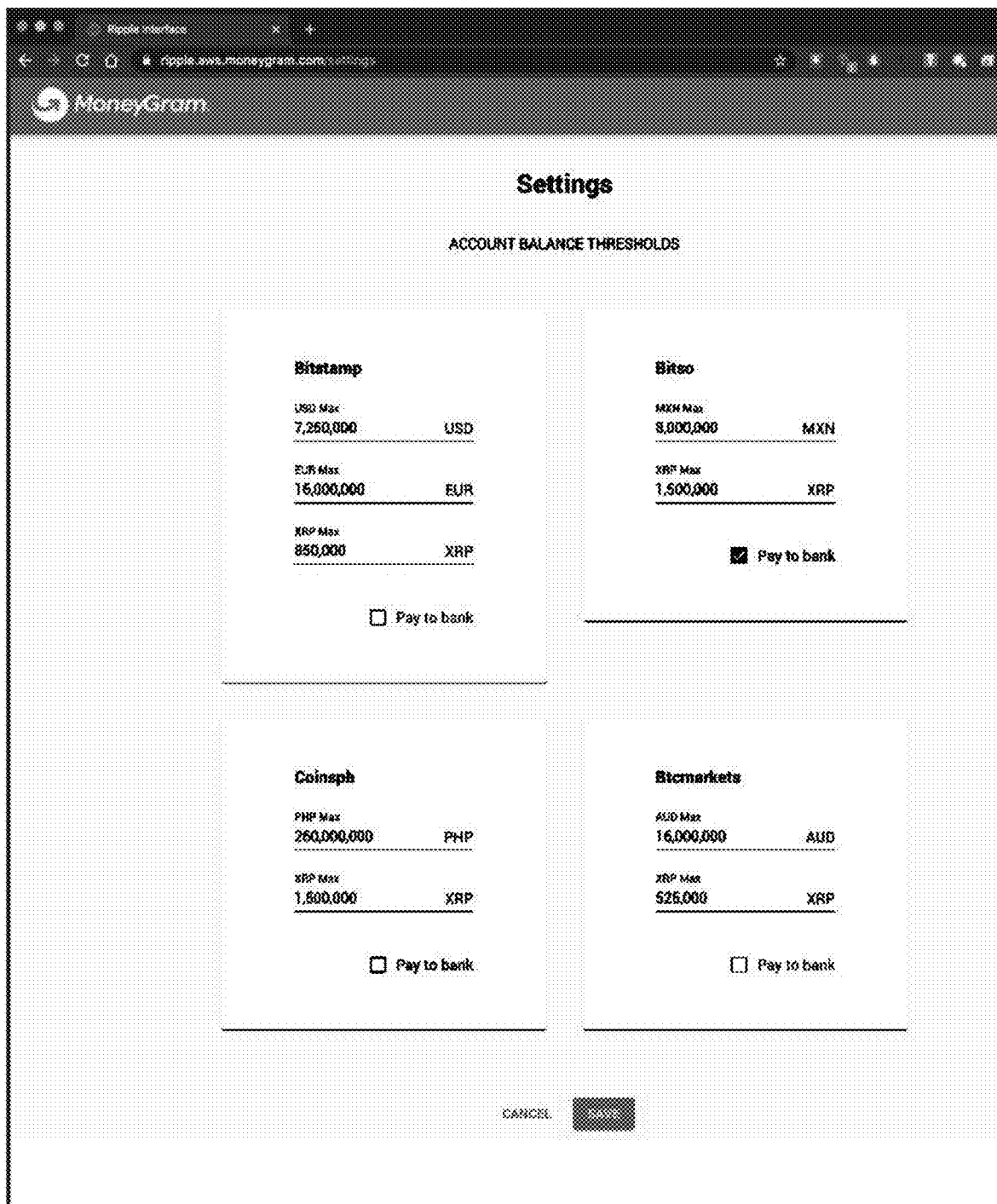
FIG. 4 is one example of a GUI page which may be employed to interface with the autonomous bot.
Figure 5:
FIG. 5 is one example of a GUI page which may be employed to interface with the autonomous bot.

Checking that the transaction does not exceed any of the risk parameters involves the volatility of cryptocurrency. More specifically, given the volatility of cryptocurrency, holding a large amount of cryptocurrency is considered a risk. Accordingly, limitations may be put in place to prevent transactions with excessive amounts to reduce the risk. Some or every exchange for some or all transactions may be checked to make sure any defined balance thresholds are not exceeded. Threshold examples are shown in FIG. 4.

Checking whether all services required to execute this trade are operational and active involves a process where a health check is executed for each of the infrastructure components. In other words, the platform will check to see that each component is "healthy" before initiating the transactions. This prevents a transaction from being locked in a limbo state from semi-executing transactions or failures.

Checking whether this settlement transaction exceeds a minimum profitability margin involves a cost analysis. More specifically, for most money movement scenarios, there are costs involved. For international transactions, these costs are generally split into two components: an FX rate and a fee. However, there can be many more components, like taxes, discounts, incentives, etc. As these cost components can vary per transaction based on external variables, it can be complex to manage these individual variables. Accordingly, the system may look at the result (e.g., it calculates the final transaction cost) and compares that to the cost of doing business for this transaction. It is noted that this is the profit on moving the money, not the profit made from a consumer. For example, a range of approximately −5% to 5% may be defined as acceptable.

If the trade is unsuccessful or one of the checks fails, a retry policy may kick in that allows the autonomous bot 104 to re-initiate the trade within a pre-defined time window. The retry may be executed with the same considerations. In addition, a failed health check may block the transaction. It is noted that both retries and self-healing may be implemented, with retries as a micromanagement tool and self-healing as a macro management tool. In another example, if the Market FX rate was too far away from the benchmark, all the calculations would be performed again with current data, but the transaction would not be allowed to proceed if it remained outside of the determined bounds.

Accordingly, in step 202, a customer (e.g., the user/customer 112) enters parameters for the transaction. In the present example, the customer is the treasury of the business controlling the autonomous bot 104 and trading platform 102.

In another embodiment, for every operation, a user may log into a portal with its user credentials using one of three login types: read only, trader, and admin. The user then selects a day or time window and a specific corridor. One embodiment of an interface that may be presented to the user is shown in FIGS. 5-7B. The user has the ability to specify the amount he/she would like to transfer. A spread rate can be provided to specify cost efficiency compared to the SWIFT/Interbank FX rates. After the schedule button is pressed, the entire process will be executed in an automated manner.

In some embodiments, the autonomous bot 104 may include some or all of the following functionality to manage the scheduler/optimizer 108 in light of the user requirements 106 and system requirements 110. The autonomous bot 104 may include the ability to cancel the scheduler and reset intraday and, within that, to be able to set the scheduler for same day trading. The autonomous bot 104 may include the ability to start scheduler on the current day. The autonomous bot 104 may include the ability to adjust the scheduler on the current day. The autonomous bot 104 may include the ability to pause/disable the scheduler on the current day (e.g., to support internal and/or external maintenance downtime). The autonomous bot 104 may include the ability to reduce the average transaction size (ATS) to increase rates/profitability. The autonomous bot 104 may include the ability to increase volume during business hours. The autonomous bot 104 may include the ability to self-heal, meaning that failed autonomous bot transactions should be recovered during the rest of the day if possible.

Figure 8:
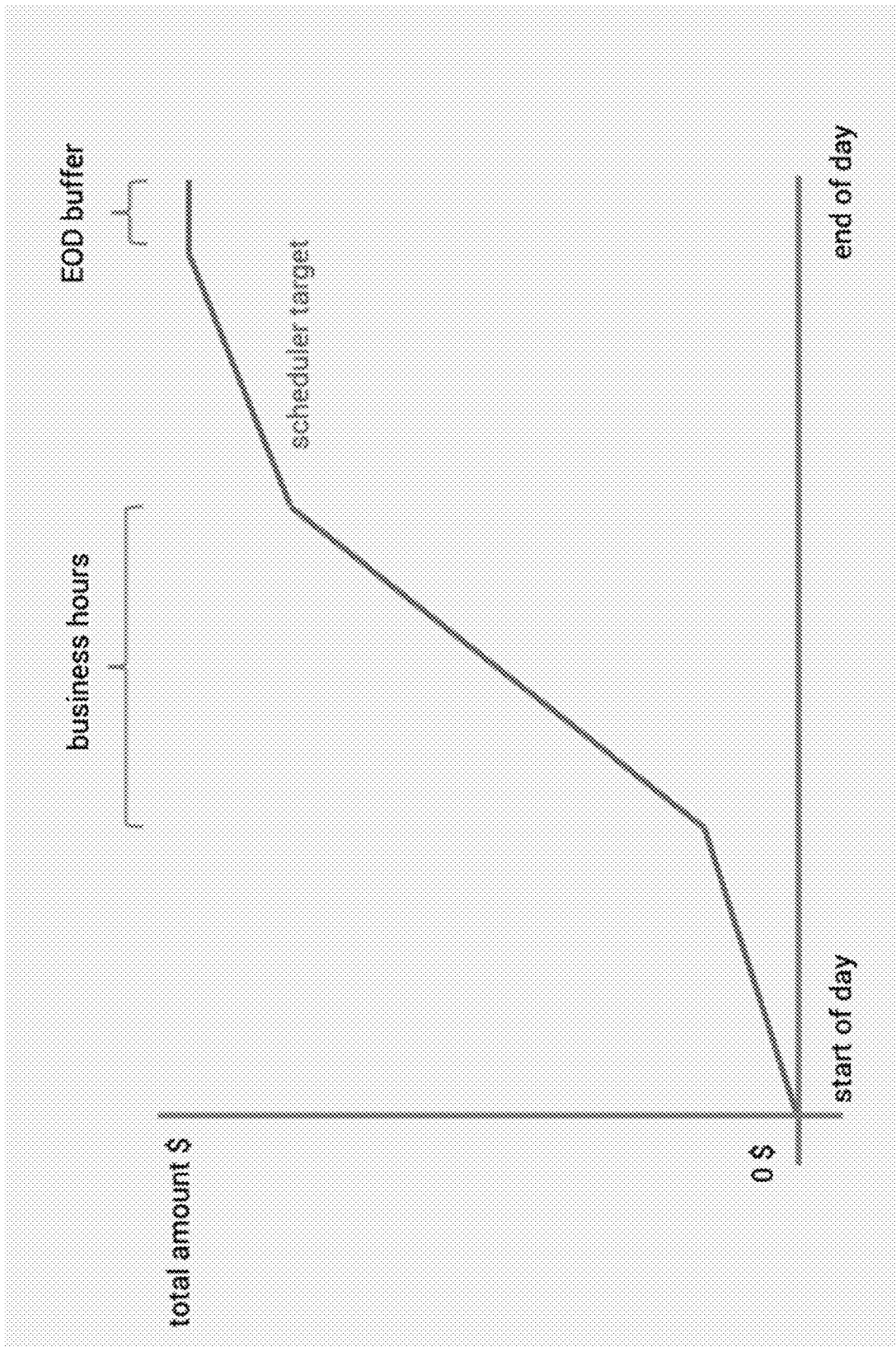
FIGS. 8 and 9 are graphs illustrating a target schedule representing daily goals of a target scheduler.
Figure 9:
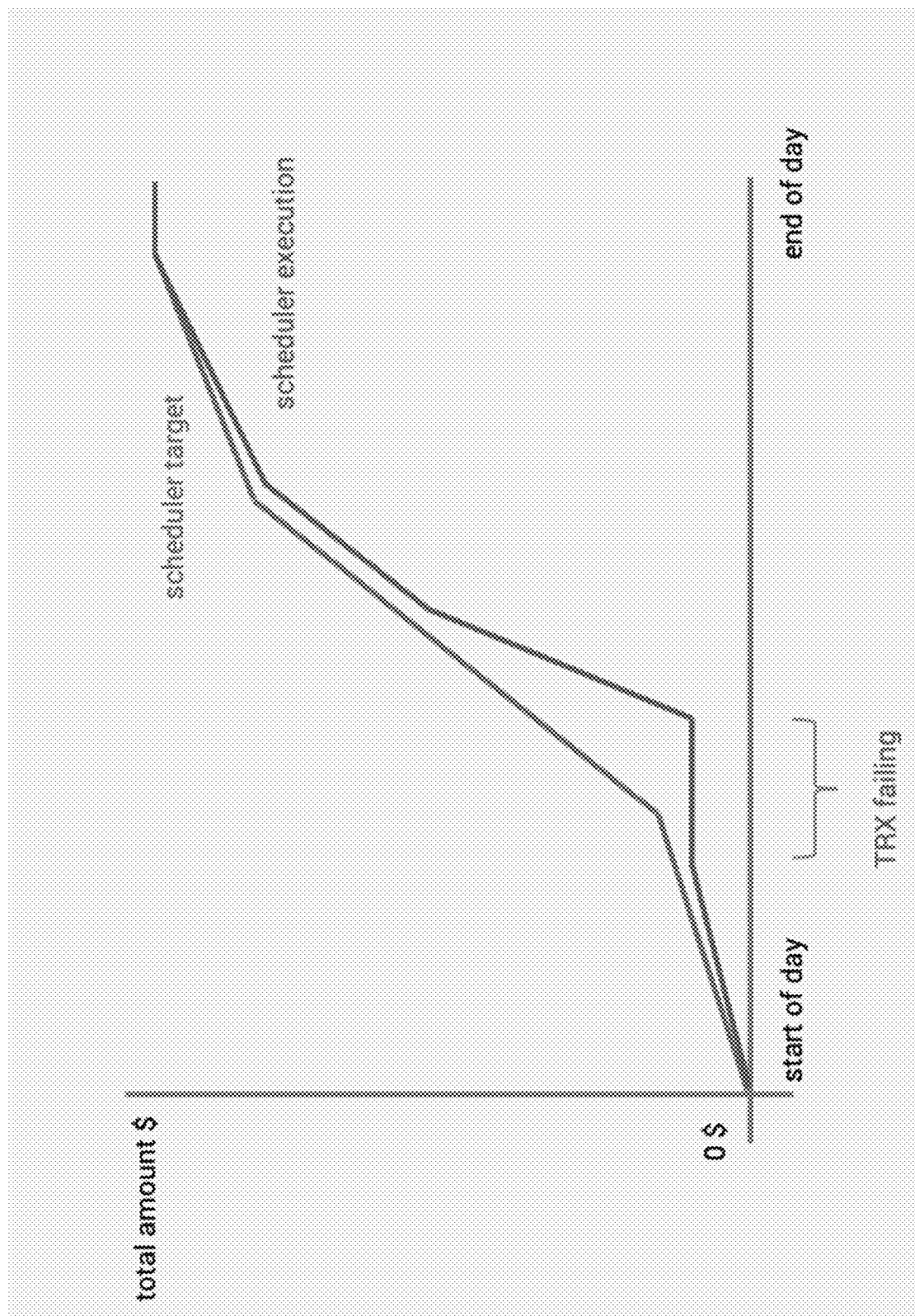

Referring to FIGS. 8 and 9, in one embodiment, the autonomous bot 104 may execute the following processes. To initiate, a user 112 (e.g., the treasury of FIG. 2) provides parameters such as a daily goal, currency, and a maximum amount per transaction. The scheduler 108 converts these daily goals into a target schedule. In the present example of FIG. 8, because the user 112 is planning to send more money during business hours, the slope of the graph changes. A buffer may be left at the end of the day with no planned transaction, which provides an opportunity to recover automatically if necessary.

The autonomous bot 104 may continuously run or may wake up at randomized timestamps to prevent FX hedging. It will calculate the distance between the current time and the suggested scheduler target. The autonomous bot 104 has a transaction size range (e.g., from $300 to $50,000), so for low deviations it can modify the transaction size to achieve a desired result. If the deviation from the target is too large so resolve with increasing the transaction size, the autonomous bot may automatically increase the transaction frequency.

Before each transaction is committed, some or all of the previously described validation steps are taken into account. If one of them fails, the transaction will not be executed, resulting in the daily send amount trailing further away from the target amount. This may prompt the autonomous bot to recalculate its execution scheduler.

Referring to FIG. 10, one embodiment of an exemplary computing system 1000 is illustrated. The system 1000 is one possible example of a portion or all of the components in preceding embodiments, including those of FIG. 1. The system 1000 may include a controller (e.g., a processor/central processing unit ("CPU")) 1002, a memory unit 1004, an input/output ("I/O") device 1006, and a network interface 1008. The components 1002, 1004, 1006, and 1008 are interconnected by a data transport system (e.g., a bus) 1010. A power supply (PS) 1012 may provide power to components of the system 1000 via a power transport system 1014 (shown with data transport system 1010, although the power and data transport systems may be separate).

It is understood that the system 1000 may be differently configured and that each of the listed components may actually represent several different components. For example, the CPU 1002 may actually represent a multi-processor or a distributed processing system; the memory unit 1004 may include different levels of cache memory, main memory, hard disks, and remote storage locations; the I/O device 1006 may include monitors, keyboards, and the like; and the network interface 1008 may include one or more network cards providing one or more wired and/or wireless connections to a network 1016. Therefore, a wide range of flexibility is anticipated in the configuration of the system 1000, which may range from a single physical platform configured primarily for a single user or autonomous operation to a distributed multi-user platform such as a cloud computing system.

The system 1000 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms depending on the use of the system 1000. The operating system, as well as other instructions (e.g., for telecommunications and/or other functions provided by the system 1000), may be stored in the memory unit 1004 and executed by the processor 1002. In other embodiments, the memory unit 1004 may be a distributed memory system distributed across a number of computer systems on a network or networks.

Any advantages and benefits described may not apply to all embodiments of the invention. When the word "means" is recited in a claim element, Applicant intends for the claim element to fall under 35 USC 112(f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC 112(f).

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

The invention claimed is:

1. A method for conducting a cross border settlement transaction, the method comprising:
    instantiating an autonomous bot in a web application having a GUI interface;
    receiving parameters for the settlement transaction via the GUI interface, the parameters including a settlement transaction amount; an initial currency and a final currency for the settlement transaction;
    dividing, by the autonomous bot, the settlement transaction into a plurality of smaller transactions and for each smaller transaction in the plurality of smaller transactions, performing a sub-method comprising:
        generate a token for the smaller transaction;
        posting, by the autonomous bot, a first quote request to a cryptocurrency payment network, including a smaller transaction amount, the initial currency and the final currency for the smaller transaction;
        forwarding, by the cryptocurrency payment network, a second quote request to available cryptocurrency exchanges that support converting from the initial currency to a cryptocurrency;
        receiving a response for the second quote request from at least one cryptocurrency exchange;
        forwarding, by the cryptocurrency payment network, a third quote request to available cryptocurrency exchanges that support converting from the cryptocurrency to the final currency;
        receiving a response for the third quote request from at least one cryptocurrency exchange;
        generating, by the cryptocurrency payment network, a single quote response to the first quote request for the smaller transaction using the response for the second quote and the response for the third quote;
        receiving the single quote response by the autonomous bot,
        performing, by the autonomous bot, verification checks for the smaller transaction;
        posting, by the autonomous bot, a quote acceptance to the cryptocurrency payment network, which in response, generates a payment ID for the smaller transaction;
        sending, by the autonomous bot, settlement payment to the cryptocurrency payment network;
        generating a locked state for the smaller transaction after an agreement between the cybercurrency payment network, the first cybercurrency exchange, and the second cybercurrency exchange that they are connected, have enough information, and are willing to proceed,
        waiting until the locked state becomes available before proceeding with subsequent method steps; if no locked state becomes available, aborting the smaller transaction and repeating the smaller transaction at a different time slot,
        executing a transaction on the first cryptocurrency exchange to convert from the first currency to a cryptocurrency;
        withdrawing the cryptocurrency from a cryptocurrency ledger which performs a digital asset exchange and depositing the cryptocurrency amount into the second exchange;
        converting, by the second cryptocurrency exchange, the cryptocurrency amount into the final currency;
        forwarding the final currency payment to a payout bank/location; and
    repeating the above sub-method until a total of the plurality of smaller transaction amounts equal the transaction amount.

2. The method of claim 1, further comprising sending an order, by the cryptocurrency payment network, to a cryptocurrency ledger, to the first cryptocurrency exchange, and the second cryptocurrency exchange.

3. The method of claim 1, further comprising polling the cybercurrency payment network for a transaction status of the smaller transaction at defined intervals until the single quote response is received.

4. The method of claim 1, further comprising scheduling each of the smaller payments to a particular time slot based on transactional costs for the time slot.

5. The method of claim 1, wherein the verification checks are selected from the group consisting of checking a proposed settlement cost on selected rails, checking live forex rates at large financial institutions, checking liquidity in a destination market, checking to ensure that adequate funds are available at a sender's location, checking that the transaction does not exceed any predetermined risk parameters, checking if all services required to execute the transaction are operational and active, and determining if the settlement transaction exceeds a minimum profitability margin.

6. The method of claim 1, further comprising selecting a rail, by the autonomous bot, from a plurality of rails based on transaction completion times.

7. The method of claim 1, further comprising selecting a rail, by the autonomous bot, based on accessibility to funds, compliance, and liability risks.

8. The method of claim 1, further comprising managing a scheduler/optimizer for the smaller transactions, by the autonomous bot, using user requirements and system requirements.

9. The method of claim 8, further comprising cancelling the scheduler/optimizer and resetting the scheduler/optimizer for intraday trading.

* * * * *